United States Patent [19]

Holsztynski

[11] Patent Number: 4,739,474
[45] Date of Patent: Apr. 19, 1988

[54] GEOMETRIC-ARITHMETIC PARALLEL PROCESSOR

[75] Inventor: Wlodzimierz Holsztynski, Orlando, Fla.

[73] Assignee: Martin Marietta Corporation, Bethesda, Md.

[21] Appl. No.: 474,209

[22] Filed: Mar. 10, 1983

[51] Int. Cl.⁴ ............................................. G06F 15/16
[52] U.S. Cl. .................................................... 364/200
[58] Field of Search ... 364/200 MS File, 900 MS File, 364/704, 736, 741, 768, 786

[56] References Cited

U.S. PATENT DOCUMENTS

| | | | |
|---|---|---|---|
| 3,701,976 | 10/1972 | Shively | 364/200 |
| 3,815,095 | 6/1974 | Wester | 364/200 |
| 4,065,808 | 12/1977 | Schomberg et al. | 364/200 |
| 4,215,401 | 7/1980 | Holsztynski et al. | 382/41 |
| 4,314,349 | 2/1982 | Batcher | 364/900 |
| 4,524,455 | 6/1985 | Holsztynski et al. | 364/200 |

FOREIGN PATENT DOCUMENTS 1536933 12/1978 United Kingdom .

OTHER PUBLICATIONS

European Search Report with attached British Patent No. 1,536,933, Dec. 29, 1978.

*Primary Examiner*—Gareth D. Shaw
*Assistant Examiner*—Kevin A. Kriess
*Attorney, Agent, or Firm*—Burns, Doane, Swecker & Mathis

[57] ABSTRACT

A plurality of identical processor cells arranged interconnected to form a data processor for processing digital data signals.

Each of the cells includes an arithmetic processing element having three input terminals and two arithmetic output terminals. A plurality of memories connected to said arithmetic processing element are individually controllable to supply selected ones of a plurality of predetermined data signals to the input terminals of said processing element in response to control signals from a controller. The memories are connected to the arithmetic processing element and the controller such that both logical and arithmetic operations are performed by the arithmetic element. The data processor includes n times m cells interconnected in an m by n matrix with interior cells and edge cells.

The arithmetic processing element, preferably is a full adder having two data input terminals, a carry input terminal, a sum output terminal and a carry output terminal, and the plurality of memories includes first, second and third single-bit data registers, each selectively controllable to load one of the plurality of predetermined data signals, and a multi-bit memory such as a RAM having an output terminal and selectively addressable storage locations.

56 Claims, 7 Drawing Sheets

Fig. 3

|   | 1 | 2 | 3 | 4 | 5 | 6 |
|---|---|---|---|---|---|---|
| 1 | P11 | P21 | P31 | P41 | P51 | P61 |
| 2 | P12 |  |  |  | ▨ | P62 |
| 3 | P13 |  |  | ▨ | ▨ | P63 |
| 4 | P14 |  | ▨ | ▨ |  | P64 |
| 5 | P15 | ▨ |  |  |  | P65 |
| 6 | P16 | P26 | P36 | P46 | P56 | P66 |

Fig. 4

|   | 1 | 2 | 3 | 4 | 5 | 6 |
|---|---|---|---|---|---|---|
| 1 |  |  |  |  |  |  |
| 2 |  |  |  |  |  |  |
| 3 |  |  |  | ▨ |  |  |
| 4 |  |  | ▨ |  |  |  |
| 5 |  |  |  |  |  |  |
| 6 |  |  |  |  |  |  |

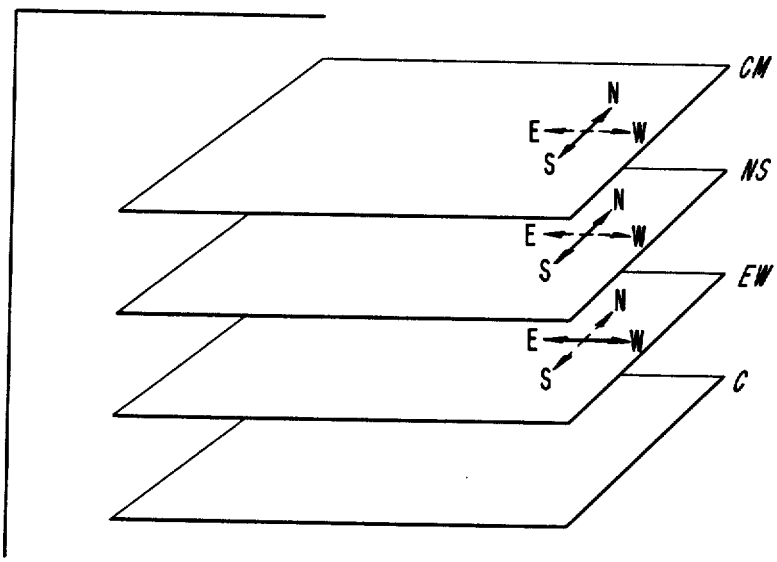
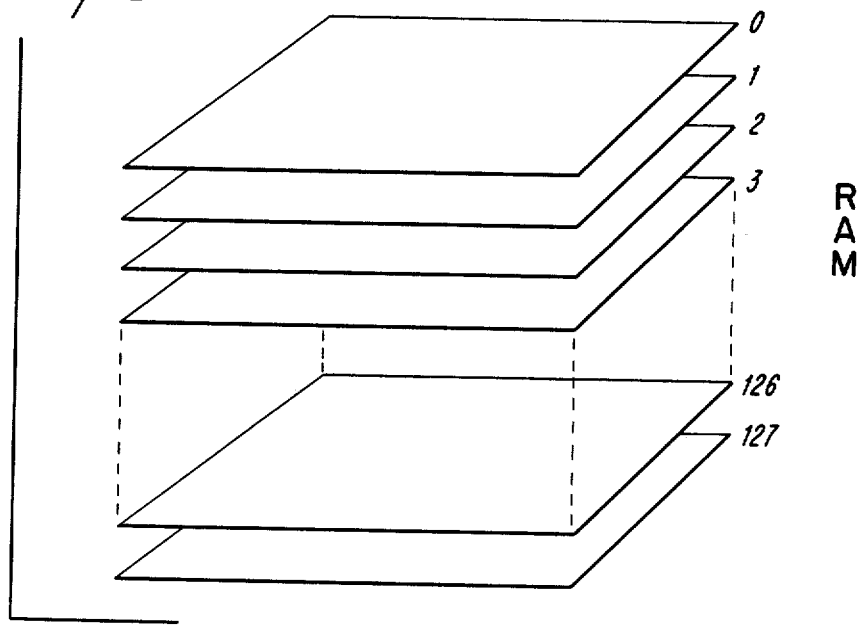
FIG. 6

GEOMETRIC-ARITHMETIC PARALLEL PROCESSOR

BACKGROUND OF THE INVENTION

1. Field of the Invention

The present invention relates to high speed, parallel data processing systems and, more particularly, to a parallel data processor comprised of an array of identical, uniquely constructed and interconnected cells which perform arithmetic and logical data processing functions under the control of a master controller.

2. State of the Prior Art

Parallel data processors typically employ a number of identical processing cells arranged in a matrix-like array so that data can be processed in parallel. The usual parallel processor consists of a n by m identical cells each connected to its immediately neighboring cells and each controlled by a central controller. This approach is particularly suited for processing data matrices of the types encountered in high resolution image processing. A description of one such processing array and its many applications in data processing is set forth in Holsztynski et al. patent No. 4,215,401.

The basic structure of each cell of the processor described in the Holsztynski et al. patent includes a random access memory (RAM), a single bit input accumulator, a single bit output accumulator and a NAND gate processing element. The RAM, the input terminal of the input accumulator, the output terminal of the output accumulator and one input terminal of the NAND gate are connected to a data bus. The output signal from the input accumulator is supplied to the second input terminal of the NAND late which has its output terminal connected to the input terminal of the output accumulator.

With a plurality of identical cells of this type interconnected with neighboring cells and a central controller, the parallel processor described in this patent can be programmed to rapidly perform a variety of elemental logical functions on large amounts of data. Combinations of these elemental functions by proper program sequences allow the processor to perform more complex logical and even arithmetic functions.

While the parallel processor shown in the foregoing patent permits the construction of large arrays and thus parallel processing of large data matrices, the use of a NAND gate as the processing element and the arrangement of the storage elements in relation to the NAND gate result in a requirement for relatively complex sequences of program instructions and some loss of speed when performing complex logical and arithmetic functions. Holsztynski et al. recognized that the addition of more complex processing elements such as full adders to the disclosed NAND gate processor embodiment would increase data processing speed. However, such addition of elements to the processor cell also would result in considerably increased complexity and cost, particularly for large arrays.

This combination of a logic element to perform logical functions and a full adder to perform arithmetic functions in a processing cell for a parallel processor was also suggested in a paper by John H. Smit of Goodyear Aerospace entitled "Architecture Description For The Massively Parallel Processor (MPP) And The Airborne Associative Processor (ASPRO)", prepared for the Very High Speed Computing Symposium, Sept. 9-10, 1980 at Georgia Institute of Technology. The processor cell disclosed in the Smit paper includes various registers and logic elements for "logic and routing" functions. A full adder, shift register and single bit registers are used for "bit-serial arithmetic" operations. As suggested in the Holsztynski et al. patent, this arrangement speeds up the processing of data by providing separate logic and arithmetic sections. Again, however, the complexity and cost factors are considerably greater than with the NAND gate processing arrangement of Holsztynski et al.

OBJECTS AND BRIEF SUMMARY OF THE PRESENT INVENTION

It is an object of the present invention to provide a novel parallel data processing method and system which performs both logical and arithmetic operations at very high speeds and yet is relatively simple, particularly at the processor cell level.

It is another object of the present invention to provide a novel parallel data processing method and system which operates with relatively simple micro-instructions to perform arithmetic and logical functions with greater efficiency than known parallel processors.

It is a further object of the present invention to provide a novel bit processing method and cell which is of relatively simple construction, has a minimum of components and can rapidly perform arithmetic and logical functions.

It is still another object of the present invention to provide a novel data processing method and processing cell which uses an arithmetic processor, in particular a full adder, to perform both arithmetic and logical operations.

The foregoing and other objects and advantages are provided in accordance with the present invention through an arrangement of unique processing cells controlled by a central controller. Each processing cell includes an arithmetic device connected to memories and signal selection circuits such that the arithmetic device can be controlled to perform both logical and arithmetic operations on data bits. An array of identical cells is constructed by providing connections between each cell and its neighboring cells with edge cells in the array also communicating with suitable data input/output equipment. A controller supplies control and address signals to the cells in accordance with a programmed sequence which results in the performance of desired operations on a data matrix introduced at the edge cells.

In the preferred embodiment, the arithmetic device in each processor cell is a full adder. A storage device such as a one bit register is connected to each input terminal of the full adder. Since the adder has two data input terminals and a carry input terminal, three such storage devices are provided. One of the storage devices is designated the north/south (NS) input register, another is designated the east/west (EW) input register and the third is designated the carry (C) input register.

A signal selection circuit at the input terminal of each storage device selectively supplies input data to each storage device in response to control signals from the central controller. The signals available for selection by the NS input register data selection circuit are the respective north and south output signals from the northern and southern neighboring cells, the output signal from the NS register itself, and a data bus signal. Similarly, the EW input register data selection circuit may choose from the respective east and west output signals from the eastern and western neighboring cells, the output signal from the EW register and the data bus signal. The carry input register data selection circuit include the "carry" output signal from the full adder, the carry register output signal and a logic "one" and a logic "zero", preferably from the controller, or from some other suitable source.

A random access memory (RAM) of each cell, selectively addressable by the controller, has its output terminal connected to a signal selection circuit which applies the input signals selected by the controller to the data bus. The adder "sum" or plus output signal is also applied to this selection circuit for selective application to the bus in response to commands from the controller. In addition to addressing or "reading" the contents of RAM storage, the RAM may be controlled by the controller to store or "write" data from the data bus and, if desired by addition of signal selection circuitry at the RAM data input terminal, to write data from other sources. Of course, the RAM may be left unchanged when executing instructions not involving writing into the RAM.

Through the use of appropriate sequences of instructions, data is selectively presented to the full adder to perform both logical and arithmetic functions. For example, by preloading a binary ONE in the carry register connected to the carry input terminal of the full adder and taking the output signal from the carry output terminal of the full adder, the logical OR of the inputs to the full adder data input terminals results. Similarly, by preloading a binary ZERO in the carry register, the carry output terminal of the full adder provides the logical AND of the data input signals. A multitude of transfer (routing) functions and arithmetic functions as well as other logical functions similarly can be commanded by relatively simple program routines.

It will thus be appreciated that with this arrangement, there is no need for separate arithmetic and logic circuits. The full adder performs both functions in response to commands generated by sequences of micro-instructions in the central controller. Relatively short sequences of instructions can command the cells to perform both arithmetic and logic functions, thereby increasing processor speed and minimizing programming complexity.

BRIEF DESCRIPTION OF THE DRAWINGS

The foregoing and other objects and advantages of the present invention will become apparent to one skilled in the art to which the invention pertains from the following detailed description when read in conjunction with the drawings in which:

FIGS. 3 and 4 are graphic illustrations of data matrices before and after erosion processing by a parallel processor in accordance with the present invention;

FIG. 6 is a graphic illustration of the memory planes of a parallel processor using the cell structure of the FIG. 5 embodiment, showing the data transfer directions within each plane where appropriate;

DETAILED DESCRIPTION

Figure 1:
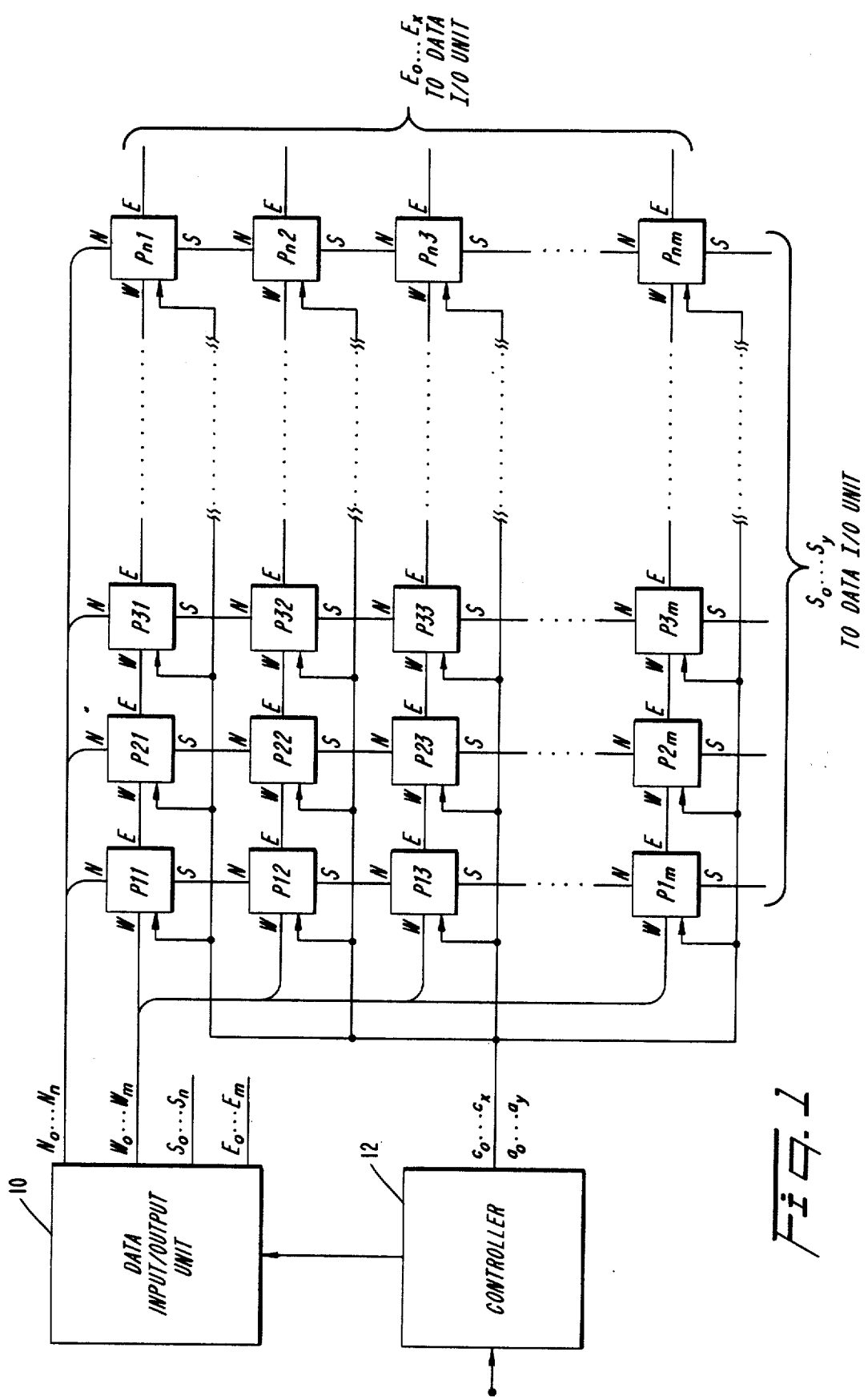
FIG. 1 is a functional block diagram of a parallel data processor constructed with cells in accordance with the present invention.

A parallel processor implemented as an array of identical cells in accordance with the present invention is functionally illustrated in the block diagram of FIG. 1. In the FIG. 1 embodiment, there are n columns and m rows of identical processor P cells connected to form an n by m matrix. The edge cells of the array (i.e., the cells in the first and last rows P00-Pn0,Pm-Pnm and in the first and last columns P00-P0m and Pn0-Pnm) are connected to a data input/output unit 10 as illustrated. Every cell receives command and address signals $c_0$-$c_x$ and $a_0$-$a_y$, respectively, from a controller 12. In addition, clock signals (not illustrated) may be provided from the controller 12 to each cell, and the data input/output unit may be controlled by the controller 12.

Each interior cell is connected to each of its neighboring cells so that four connections are provided to each cell. Specifically, the cells are each connected to their north, south, east and west neighbors, the connections being designated N, S, E, and W, respectively, in FIG. 1. Thus, each cell can exchange data with any of its neighbors under the control of the controller 12.

In operation, input data to be processed is supplied to the data input/output unit 10. This input data may be supplied, for example, from imaging devices which produce a large matrix of data "pixels", i.e., binary bits representing small parts of an image. The input data supplied to the data input/output device 10, either directly or through the controller 12, are fed to the edge cells of the parallel processor which are controlled by the controller 12 to process this data in accordance with a sequence of micro-instructions. The instructions may command processing which involves arithmetic operations, logical operations or merely data transfer.

The processing operation commanded by the controller 12 is simultaneously performed on all data by all cells. As input data is being transferred into the processor, for example, the controller may command a series of simple transfers of data to neighboring cells in order to load an entire data matrix. Following this loading operation, the controller 12 may command programmed sequence of operations to sum, subtract, multiply, complement, rotate, transpose or otherwise perform arithmetic and/or logical operations on individual bits in cell storage and/or from neighboring cells. The processing continues until all desired operations have been performed, and the results are transferred to the data input/output unit 10.

The data input/output unit 10 may be any suitable conventional electronic device for interfacing the parallel processor with other equipment. For example, this unit may include controllable input and output buffers for temporarily storing the input data before and after processing. Likewise, the controller 12 may be any suitable, conventional control unit capable of generating command signals and address signals in appropriate timed sequences in response to a sequence of program instructions. Suitable data input/output devices and controllers are illustrated and described in detail in U.S. Pat. No. 4,215,401 and in the other prior art discussed herein.

Figure 2:
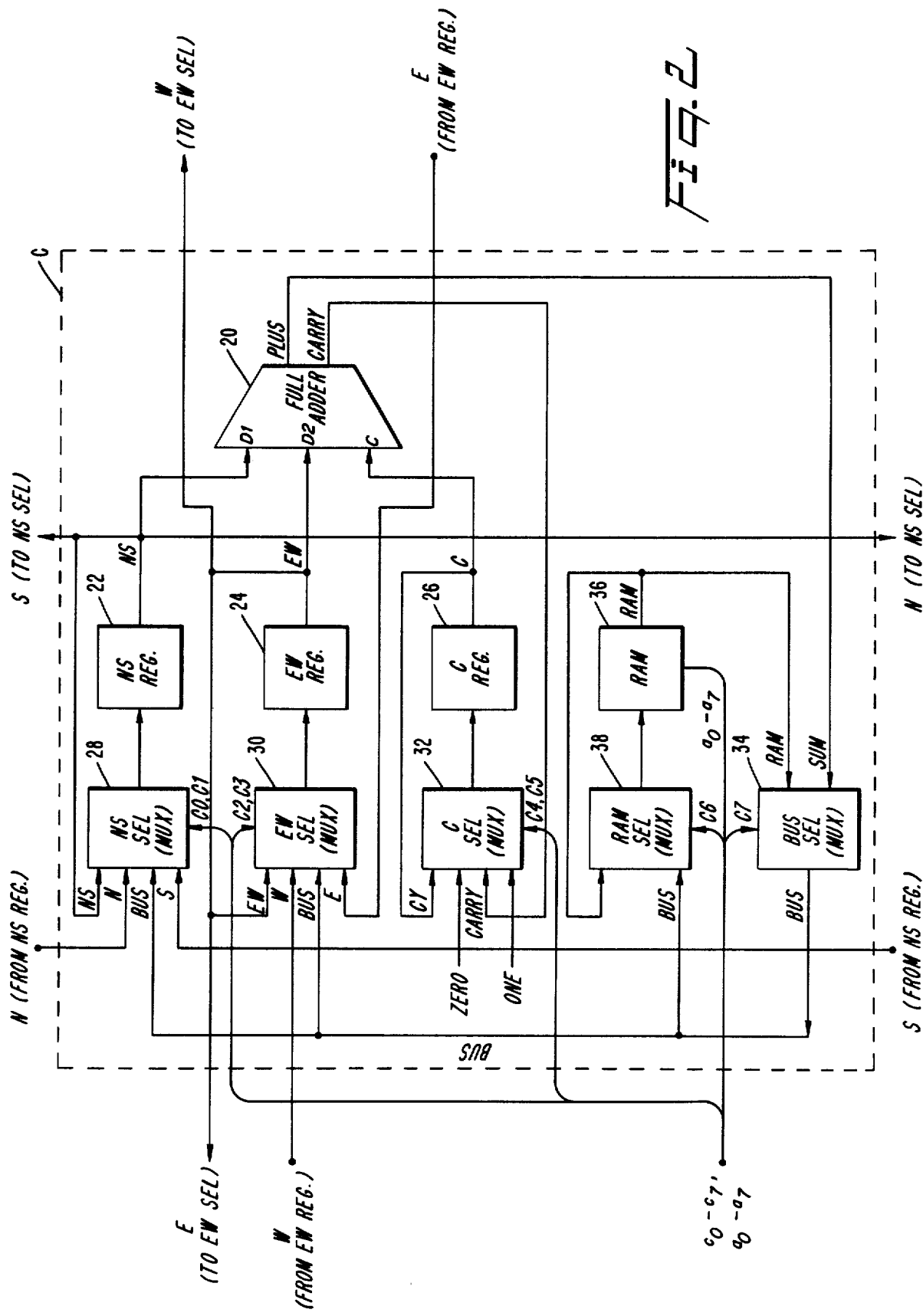
FIG. 2 is a functional block diagram of one embodiment of a processor cell in accordance with the present invention.

One embodiment of a parallel processor cell useful in connection with a parallel processor array such as that illustrated in FIG. 1 is illustrated in FIG. 2. The cell P includes an arithmetic processing element 20, preferably a full adder of any suitable conventional configuration. The full adder has a first data input terminal D1, a second data input terminal D2 and a carry input terminal C. The output terminals of the adder 20 include a sum output terminal and a carry output terminal which provide a PLUS output signal and a CARRY output signal, respectively.

A plurality of memories are connected to the full adder and are controllable by the command and address signals $c_0-c_x$, (where x is 7 in the illustrated embodiment) and $a_0-a_y$ (where y is 6 in the illustrated embodiment) from the controller 12 of FIG. 1. The illustrated arrangement of memories connected as shown to the full adder permits the full adder to perform both logical and arithmetic functions. In particular, single bit registers or memories 22, 24 and 26 designated the north-/south or NS register, the east/west or EW register and the carry or C register, respectively, have their output terminals connected to the respective D1, D2 and C input terminals of the full adder 20. Storage of a particular data bit in the registers 22, 24 and 26 is determined by suitable conventional signal selection circuits (bit multiplexers MUX) 28, 30 and 32 under the control of the controller 12.

More specifically, a north/south signal selection circuit or multiplexer 28 receives four data signals NS, N, BUS and S. In order to select one of these four data signals for application to the NS register 22, two control lines supply respective control signals $c_0$ and $c_1$ from the controller 12 to the selection circuit 28. The circuit 28 operates in a conventional manner such that when the control or command signals $c_0$, $c_1$ are both binary ZERO (00), the NS signal is applied to the NS register 22. When the command signals $c_0$, $c_1$ are binary ONE and binary ZERO (10), the N input signal is supplied to the NS register. The combination of binary ZERO and binary ONE (01) applies the BUS signal to the NS register, and the combination of two binary ONE's (11) applies the S signal to the NS register.

One of the four data input signals EW, W, BUS and E is selectively supplied through the EW selection circuit (MUX) 30 to the EW register in response to the command signals $c_2$, $c_3$ in the same manner as described above. Similarly, one of the data signals CY, ZERO, CARRY and ONE is selectively applied through the C selection circuit (MUX) 32 to the C register 26 in response to the $c_4$ and $c_5$ command signals.

The PLUS output signal from the sum output terminal of the full adder 20 is applied to one data input terminal of a two input bus selection circuit (MUX) 34. The CARRY output signal from the carry output terminal of the full adder 20 is supplied to one input terminal of the carry or C selection circuit 32 as was previously mentioned. The bus selection circuit 34 operates in response to the $c_7$ command signal to apply one of the two input signals to a data BUS. The data BUS is connected to each of the data selection or multiplexer circuits 28, 30 and 38 to supply the BUS signal thereto.

An addressable multi-bit memory 36, preferably a 128 bit random access memory (RAM), is supplied with address signals $a_0-a_y$ (wherein y is 6 for a 128 bit RAM) from the controller 12 of FIG. 1. The RAM output signal from the RAM 36 is supplied to the second input terminal of the bus selection circuit 34, while the input signal to the RAM 36 is either the BUS signal or the RAM output signal as selected by a RAM selection circuit (MUX) 38 under the control of the $c_6$ command signal.

The data input signals to each processor cell are as follows. The N signal supplied to the NS selection circuit 28 is the signal from the NS register of the northern neighboring cell while the S signal supplied to circuit 28 is the signal from the NS register of the southern neighboring cell. The W signal supplied to the EW selection circuit 30 is the signal from the EW register of the western neighboring cell while the E signal supplied to circuit 30 is the signal from the EW register of the eastern neighboring cell. It will thus be seen that each cell receives and can store data bits from any neighboring cell (or from the data input/output unit in the case of edge cells).

The output signals from each processor cell are taken from the NS and EW registers. The NS register output signal is designated as both the N and S output signals which are supplied to the NS selection circuits of southern and northern neighboring cells. The EW register output signal is designated as both the E and W output signals which are supplied to the EW selection circuits of the respective western and eastern neighboring cells. The NS output signal is also supplied to the NS selection circuit 28 of the immediate cell, and the EW output signal is supplied to the EW selection circuit 30 of the immediate cell. From the foregoing, it will thus be appreciated that each cell provides output signals which are available to each of four neighboring cells (or to two neighboring cells and the data input/output unit in the case of edge cells).

Table I below systematically illustrates the manner in which data is transferred throughout each cell by commands from the controller 12 of FIG. 1. In essence, Table I describes the complete "architecture" of the cell of FIG. 2 in that the commands which control all data transfers to a memory or to the bus are provided.

TABLE I

| | COMMAND WORD | | | | | | | | ACTION |
|---|---|---|---|---|---|---|---|---|---|
| | $c_0$ | $c_1$ | $c_2$ | $c_3$ | $c_4$ | $c_5$ | $c_6$ | $c_7$ | COMMANDED |
| 1. | 0 | 0 | x | x | x | x | x | x | Transfer NS to NS register |
| 2. | 1 | 0 | x | x | x | x | x | x | Transfer N to NS register |
| 3. | 0 | 1 | x | x | x | x | x | x | Transfer BUS to NS register |
| 4. | 1 | 1 | x | x | x | x | x | x | Transfer S to NS register |
| 5. | x | x | 0 | 0 | x | x | x | x | Transfer EW to EW register |
| 6. | x | x | 1 | 0 | x | x | x | x | Transfer W to EW register |
| 7. | x | x | 0 | 1 | x | x | x | x | Transfer BUS to EW register |
| 8. | x | x | 1 | 1 | x | x | x | x | Transfer E to EW register |
| 9. | x | x | x | x | 0 | 0 | x | x | Transfer C to C register |
| 10. | x | x | x | x | 1 | 0 | x | x | Transfer ZERO to C register |
| 11. | x | x | x | x | 0 | 1 | x | x | Transfer CARRY to C register |
| 12. | x | x | x | x | 1 | 1 | x | x | Transfer ONE to C register |
| 13. | x | x | x | x | x | x | 0 | x | Transfer RAM to RAM |
| 14. | x | x | x | x | x | x | 1 | x | Transfer PLUS [BUS] to RAM |
| 15. | x | x | x | x | x | x | x | 0 | Transfer RAM to BUS |

TABLE I-continued

| | COMMAND WORD | | | | | | | | ACTION |
| --- | --- | --- | --- | --- | --- | --- | --- | --- | --- |
| | $c_0$ | $c_1$ | $c_2$ | $c_3$ | $c_4$ | $c_5$ | $c_6$ | $c_7$ | COMMANDED |
| 16. | x | x | x | x | x | x | x | 1 | Transfer PLUS to BUS |

Table II below provides examples of full commands which may be various combinations of the above basic commands used to simultaneously perform a number of data transfers. Not all possible commands are listed in Table II and it will be appreciated that some combinations will be illegal since it is not possible, for example, to simultaneously load and read the RAM. Thus, for example, the combination of 1, 0 for $c_6$, $c_7$ may produce ambiguous results and should not be used.

TABLE II

| | COMMAND WORD | | | | | | | | ACTIONS |
| --- | --- | --- | --- | --- | --- | --- | --- | --- | --- |
| | $c_0$ | $c_1$ | $c_2$ | $c_3$ | $c_4$ | $c_5$ | $c_6$ | $c_7$ | COMMANDED |
| 1. | 1 | 0 | 1 | 0 | 1 | 0 | 1 | 1 | Transfer N to NS register |
| | | | | | | | | | Transfer W to EW register |
| | | | | | | | | | Transfer 0 to C register |
| | | | | | | | | | Transfer PLUS to RAM |
| 2. | 0 | 1 | 0 | 1 | 1 | 1 | 0 | 1 | Transfer PLUS to NS and EW registers |
| | | | | | | | | | Transfer ONE to C register |

As will be seen hereinafter, the above basic actions commanded by the command words may be written in a microinstruction notation for ease of understanding. For example, the action commanded by command No. 2 in Table I above may be written NS:=N signifying that the NS register is loaded with the N signal. Similarly, the complete instructions such as those in Table II may be written as catenations of the basic instructions in Table I in the foregoing notation. Example No. 1 in Table II may be written NS:=N EW:=W C:=0 RAM:=PLUS. These are also the notations which may be used for writing programs which in turn will be translated into machine language and supplied to the controller 12.

As will be appeciated from the foregoing, each program instruction is a catenation of some mnemonics, called "simple instructions", subjected to some rules. The precise and complete definition follows.

(i) Simple instructions which do not involve BUS:

| C:=0 | C:=1 | C:=CARRY |
| --- | --- | --- |
| NS:=N | NS:=S | EW:=E |
| EW:=W | | |

(ii) Simple instructions which involve BUS:
NS:=PLUS   EW:=PLUS   RAM:=PLUS
NS:EW:=PLUS   RAM:NS:=PLUS   RAM:EW:=PLUS RAM:NS:EW:=PLUS NS:=RAM
EW:=RAM NS:EW:=RAM It can be seen that there are 7 simple instructions which do not involve BUS and 10 which do, for a total of 17 simple instructions.

A program instruction is a catenation of the above "simple instructions" separated by blanks followed by a blank and double semicolon ;; preceded by an integer (the RAM address) if "RAM" appears in the catenation, and subjected to the following restrictions:

(a) within a program instruction not more than one simple instruction involves BUS, (b) a name of any register may appear in an instruction at most one time.

The foregoing is thus the "assembler language" for the programs used to control the processor in the sense that the programming language is defined by the above mnemonics and rules. Tables of exemplary programs written with the above mnemonics and strictly in accordance with the foregoing rules are provided hereinafter, e.g. see Tables VI and VII. From this source code assembler language, a conventional translator or machine language "assembler" can be used to generate the object codes (machine language) used by the controller 12.

While the notions of "BUS" and "simple instructions" are used in the explanation of the assembler language, they are not part of the assembler language. As will be seen, an instruction requiring a transfer to and from the "BUS" will not include the bus transfer steps when written in the above assembler language. Rather, the intermediate bus transfer steps are omitted. Moreover, the actual implementation of the processor cell may not include a single bus as illustrated, particularly if implemented in VLSI technology.

Since the processor cell has the above-described ability to transfer and store data, one skilled in the art will appreciate the ability of the processor to perform both arithmetic and logical functions in response to relatively simple sequences of micro instructions. To aid in understanding the operation of the processor cell in response to program instructions, it should first be noted that a full adder operates in accordance with a truth table set forth below in Table III:

TABLE III

| D1 | 0 | 1 | 0 | 1 | 1 | 0 | 1 | 0 |
| --- | --- | --- | --- | --- | --- | --- | --- | --- |
| D2 | 0 | 0 | 1 | 1 | 1 | 0 | 0 | 1 |
| C | 0 | 0 | 0 | 0 | 1 | 1 | 1 | 1 |
| PLUS | 0 | 1 | 1 | 0 | 1 | 1 | 0 | 0 |
| CARRY | 0 | 0 | 0 | 1 | 1 | 0 | 1 | 1 |

Accordingly, the following sequences of instructions (subroutines or macros) set forth below in Table IV are exemplary of the instructions which may be used to perform the below stated operations. Each instruction represents one clock pulse and that some operations are performed simultaneously during one clock pulse. Thus, the relative time involved also can be seen from the number of instructions given for each routine. It should be noted that programs are written in STOIC programming language as run on the VAX computer available from Digital Electronics Corp.

TABLE IV

```
'C:=0/1  :  IF C:=1  ELSE C:=0 THEN;
%*********************************************************************************************
% A.                              STORING A CONSTANT INTO A RAM PLANE
%*********************************************************************************************
% A1.   ADDRESS 0/1     RAM:=0/1           (LOAD [ADDRESS] WITH A CONSTANT)
%                                                                    (2 INSTRUCTIONS)
              'RAM:=0/1 :
                              NS:EW:=PLUS        C:=0/1        ;;
```

TABLE IV-continued

```
                            RAM:=PLUS                            ;;      ;
% A2.   ADDRESS RAM:=0                          (LOAD [ADDRESS] WITH 0 IN 2
%                                                           INSTRUCTIONS)
                'RAM:=0 : 0 RAM:=0/1;
% A3.   ADDRESS RAM:=1                          (LOAD [ADDRESS] WITH 1 IN 2
%                                                           INSTRUCTIONS)
                'RAM:=1 : 1 RAM:=0/1;
%****************************************************************************
% B.                    STORING NS & EW INTO EW REGISTER, NS REGISTER & RAM
%****************************************************************************
% B1.       EW:=NS__CLEAN       (LOAD EW WITH NS - NO MEMORY CONTENTS
%                               CHANGED EXCEPT EW) (2 INSTRUCTIONS)
            'EW:=NS__CLEAN :
                            NS:=PLUS        ;;
                            NS:EW:=PLUS     ;;      ;
% B2.       NS:=EW__CLEAN
            'NS:=EW__CLEAN : EW:=PLUS   ;;  EW:NS:=PLUS ;;  ;
% B3.       ADDRESS RAM:=NS__CLEAN          (ONLY [ADDRESS] CHANGED)
%                                                   ( 2 INSTRUCTIONS)
            'RAM:=NS__CLEAN :
                            NS:=PLUS        ;;
                            RAM:NS:=PLUS    ;;      ;
% B4.       ADDRESS RAM:=EW__CLEAN
                'RAM:=EW__CLEAN : EW:=PLUS  ;; RAM:EW:=PLUS ;;  ;
% B5.       ADDRESS RAM:EW:=NS__CLEAN
                'RAM:EW:=NS__CLEAN : NS:=PLUS ;;  RAM:NS:EW:=PLUS ;;  ;
% B6.       ADDRESS RAM:NS:=EW__CLEAN                       (2 INSTRUCTIONS)
                'RAM:NS:=EW__CLEAN : EW:=PLUS  ;;   RAM:NS:EW:=PLUS ;;  ;
%****************************************************************************
%                           SWAPPING DATA BETWEEN MEMORIES
%****************************************************************************
% C.    SWAP EW AND NS     (CLEAN, WITHOUT CHANGING ANY OTHER MEMORY CONTENTS)
%                                                           (3 INSTRUCTIONS)
            'EW - NS :
                    NS:=PLUS    ;;
                    EW:=PLUS    ;;
                    NS:=PLUS    ;;      ;
%****************************************************************************
% D.                STORING C INTO NS REGISTER, EW REGISTER, AND RAM
%****************************************************************************
% D1.   ADDRESS     RAM:=C__SAVE    (LOAD [ADDRESS] WITH C BUT SAVE IT FIRST)
%                                                           (2 INSTRUCTIONS)
            'RAM:=C__SAVE : DUP
                            NS:EW:=RAM      ;;   % [ADDRESS] SAVED IN NS & EW
                            RAM:=PLUS       ;;      ;
% D2.       NS:=C                                           (2 INSTRUCTIONS)
            'NS:=C : NS:EW:=PLUS  ;;  NS:=PLUS ;;   ;
% D3.       NS:=C__CLEAN                    (ONLY CONTENTS OF NS CHANGED)
%                                                           (3 INSTRUCTIONS)
            'NS:=C__CLEAN : NS:=EW__CLEAN   NS:=PLUS  ;;  ;
% D4.       NS:EW:=C__CLEAN                                 (2 INSTRUCTIONS)
            'NS:=EW:=C__CLEAN : NS:EW:=PLUS   NS:EW:=PLUS ;;  ;
% D5.       ADDRESS RAM:NS:=C__CLEAN                        (3 INSTRUCTIONS)
            'RAM:NS:=C__CLEAN : NS:=EW__CLEAN  RAM:NS:=PLUS  ;
% D6.       ADDRESS RAM:NS:EW:=__CLEAN                      (2 INSTRUCTIONS)
            'RAM:NS:EW:=C__CLEAN : NS:EW=PLUS ;; RAM:NS:EW:=PLUS ;;  ;
%****************************************************************************
% E.                            STORING INTO C REGISTER
%****************************************************************************
'C:=RAM :       NS:EW:=RAM   ;;     C:=CARRY   ;;   ;   % (2 INSTRUCTIONS)
'C:=PLUS :      NS:EW:=PLUS  ;;     C:=CARRY   ;;   ;   % (2 INSTRUCTIONS)
'C:=NS :        EW:=NS__CLEAN       C:=CARRY   ;;   ;   % (3 INSTRUCTIONS)
'C:=EW :        NS:=EW__CLEAN       C:=CARRY   ;;   ;   % (3 INSTRUCTIONS)
%****************************************************************************
% F.                            LOGICAL COMPLEMENT
%****************************************************************************
% F1.   A B (A):=NOT(B)                                     (3 INSTRUCTIONS)
            '(A):=NOT(B) :
                            NS:EW:=RAM C:=1   ;;
                            EW:=PLUS   C:=0   ;;
                            RAM:=PLUS          ;;    ;
% F2.       NS:=NOT__NS__CLEAN                              (3 INSTRUCTIONS)
            'NS:=NOT__NS__CLEAN:
                            C:=1         ;;
                            NS:=PLUS C:=0    ;;
                            NS:=PLUS         ;;     ;
%****************************************************************************
% G.                            "AND" & "OR"
%****************************************************************************
% G1.       C:=NS__AND__EW                                  (2 INSTRUCTIONS)
            'C:=NS__AND__EW :
                            C:=0        ;;
```

TABLE IV-continued

|  |  |  | C:=CARRY ;; | ; | % CLEAN |
|---|---|---|---|---|---|
| % G2. |  | C:=NS_OR_EW<br>'C:=NS_OR_EW : |  |  | (2 INSTRUCTIONS) |
|  |  |  | C:=1 ;;<br>C:=CARRY ;; | ; | % CLEAN |
| % G3. | ADDRESS | RAM:=NS_AND_EW&C:=NS_AND_EW<br>'RAM:=NS_AND_EW&C:=NS_AND_EW :<br>C:=0 ;;<br>C:=CARRY NS:EW:=PLUS ;;<br>RAM:=PLUS ;; | | ; | (3 INSTRUCTIONS) |
| % G4. | ADDRESS | RAM:=NS_AND_EW&C:=NS_OR_EW_CLEAN<br>'RAM:=NS_AND_EW&C:=NS_OR_EW_CLEAN<br>C:=NS_OR_EW RAM:=PLUS ;; ; | | | (3 INSTRUCTIONS) |
| %•••••••••••••••••••••••••••••••••••••••••••••••••••••••••••••••••••••••••••••••••••••••••••••••••••••• |
| % H. |  | EXCLUSIVE OR "XOR" & EQUIVALENCE "EQV" |
| %•••••••••••••••••••••••••••••••••••••••••••••••••••••••••••••••••••••••••••••••••••••••••••••••••••••• |
| % H1. | ADDRESS | RAM:=NS_XOR_EW<br>'RAM:=NS_XOR_EW :<br>C:=0 ;;<br>RAM:=PLUS ;; | | ; | (2 INSTRUCTIONS) |
| % H2. |  | NS:=NS_EQV_EW<br>'NS:=NS_EQV_EW :<br>C:=1 ;;<br>NS;=PLUS ;; | | ; | (2 INSTRUCTIONS) |
| % H3. | ADDRESS | RAM:NS:=NS_XOR_C<br>'RAM:NS:=NS_XOR_C :<br>NS:=PLUS C:=0 ;;<br>RAM:NS:=PLUS ;; | | ; | (2 INSTRUCTIONS) |

By way of explanation, the program instructions of Table IV are each preceded by statements which explain the procedure to follow and the conditions which must be set up before proceeding with the routine. These statements, which are not part of the routines actually executed, are preceded by a percentage sign (%). In the first example, the part A of Table IV provides a generalized procedure and two more specific procedures (A1, A2 and A3, respectively) for loading a constant into a RAM plane. In routine A1, the routine must be provided with two intergers residing in the STOIC stack as the top two items of data. The first integer provided is a RAM address and the second is a constant "0" or "1". These integers will reside in the stack, respectively, next to the top (RAM address) and at the top (constant 0 or 1).

The actual program routine begins with the name of the routine after the apostrophe (') and ends after the last instruction at the single semi-colon (;). The first of the two instructions loads PLUS into the NS and EW registers and loads the constant (on the top of the STOIC stack, either 0 or 1) into the C register. The PLUS output signal is then loaded into the RAM address location specified as the second item of data in the STOIC stack.

Routines A2 and A3 are more specific examples of storing a constant in a RAM plane. With these routines a specific constant, "0" in the case of routine A2 and "1" in the case of routine A3, is loaded into a specified RAM address location using the same program (i.e., RAM:=0/1) set forth in routine A1. The remaining routines set forth in the Table follow these same formats to product the results set forth in the remarks accompanying them.

It will be appreciated from the foregoing that various logical transfer or routing functions can be performed indirectly where they cannot be performed directly because of the connections of the various components. For example, the carry register is not directly connected to the BUS nor can it directly receive the contents of the NS or EW registers. Yet, this register can be loaded with the NS and EW register contents, can receive the contents of the RAM, etc. by using the full adder as a logical element. Similarly, the NS and EW registers can not be directly loaded with a constant yet they may be indirectly loaded by an appropriate sequence of instructions. In addition to the foregoing examples of logical operations performed by the full adder, it can be seen that various arithmetic operations such as addition can be radily performed by merely presenting the appropriate input data to the full adder.

The manner in which a parallel processor using the cell of FIG. 2 may operate to process data matrices may be understood with reference to FIGS. 3 and 4. FIG. 3 graphically illustrates a simple 6 by 6 data matrix in which each darkened square represents a binary ONE bit at a particular location in the matrix while each white square represents a binary ZERO bit at a particular location.

For the purposes of this example, it is assumed that the parallel processor is a 6 by 6 array of identical cells and that, at the start of the processing cycle, each bit of the data matrix is loaded in the RAM of the appropriate cell in address position 5. Thus, the 5th cell in the 2nd row (P52), the 4th and 5th cells in the 3rd row (P43, P53), and 3rd and 4th cells in the 4th row (P34, P44) and the 2nd cell in the 5th row (P25) of the processor array having binary ONE's in the RAM at address position 5. All other cells have a binary ZERO in this RAM address position.

FIG. 4 graphically illustrates the result which would be obtained if the data illustrated in FIG. 3 were subjected to a simple, exemplary conventional "erosion" process that is used extensively in image processing. It can be seen in FIG. 4 that the result of the illustrated erosion process is a binary ONE in the 4th and 3rd cells of the respective 3rd and 4th rows (cells P43 and P34). To achieve this result, each data bit in each matrix location is compared with each bit to its right in the same row. If each of the two successive bits is a binary ONE, a binary ONE is stored in the RAM of the cell corresponding to the cell location from which the comparison is initiated (the "base" cell). If any other condition exists (both ZERO's or one ZERO), a binary ZERO is stored in the RAM of that cell location. In the illustrated embodiment, this result of the comparison is stored at RAM address 7. Thus, FIGS. 3 and 4 are graphic illustrations of the contents of RAM address 5 and 7 before and after erosion processing.

The series of instruction for performing the process illustrated in FIGS. 3 and 4 is as follows:

TABLE V

| 'EROSION : | | | |
|---|---|---|---|
| 5 | NS:EW:=RAM % | Load RAM address 5 | |
|  | C:=0 ;; % | Set carry register C to 0 | (INST. 1) |
|  | EW:=E ;; % | East shift | (INST. 2) |
|  | C:=CARRY % | register has the result | |
|  | NS:EW:=PLUS | % | (INST. 3) |
| 7 | RAM=PLUS ;; ; % | Store the result from C into RAM | |
|  | % | address location 7 | (INST. 4) |

Instruction 1 loads both the EW and NS registers with the data bit in RAM address location 5 and sets the carry register to binary zero. Instruction 2 loads the EW register with the data from the EW register of the eastern neighboring cell, (the E data signal), in effect shifting the RAM data in address location 5 to the left into the EW register of each western neighboring cell. Now, the data from RAM address 5 of each "base cell" is in the NS register of that cell and the data from the EW register of the eastern neighbor of each base cell is in the EW register of the base cell. Since the carry register has been set to ZERO, the CARRY output signal from the carry output terminal of the full adder is the AND logical function of the signals in the EW and NS registers (see subroutine C above). Accordingly, the CARRY output signal is a binary ONE if the contents of both the NS and EW registers are binary ONE's, and is a binary ZERO for all other conditions. At the end of instruction 3, therefor, the CARRY output signal of each cell adder is the desired result, the AND function of each base cell and its immediate neighbor to the right (eastern neighbor).

To obtain the CARRY signal as the output stored in RAM memory location 7, the routine similar to subroutine RAM:=C_SAVE from D1 of Table IV above is used. First the CARRY signal is stored in the carry register and both the NS and EW register are set to the same value such as PLUS signal (instruction 3). The PLUS signal then becomes the same as the signal in the carry register and can be stored in RAM by gating it through the bus selector and RAM selector circuits to the RAM input terminal and "writing" this signal into RAM memory location 7 (instruction 4).

From the foregoing it will be appreciated that with only six simple instructions over a period of only four clock pulses of the processor system, the entire erosion process for a 6 by 6 data matrix is completed. Regardless of matrix size, this same process is accomplished with the same number of instructions.

Another data processing example using the processor cell of the FIG. 2 embodiment is provided in Table VI below. Using the program of Table VI, a form of a convolution process is performed. Specifically, two neighboring points of data are, in essence, averaged by this program. Once again, the program is written in STOIC.

% Let the contents of planes 0,1,2 be interpreted
% as a 2 dimensional array of 3 bit non-negative
% integers. Let contents of plane 0 be the least significant
cant
% bits, and of plane 2 the most significant. The following
% program adds to the each integer its eastern neighbor
% and stores the resulting 4 bit sums in planes 10, 11, 12, 13

TABLE VI

| 'ADD_EAST : | | |
|---|---|---|
| 0 | NS:EW:=RAM C:=0 ;; | |
|  | EW:=E ;; | |
| 10 | RAM:=PLUS C:=CARRY ;; | |
| 1 | NS:EW:=RAM ;; | |
|  | EW:=E ;; | |
| 11 | RAM:=PLUS C:=CARRY ;; | |
| 2 | NS:EW:=RAM ;; | |
|  | EW:=E ;; | |
| 12 | RAM:NS:EW:=PLUS C:=CARRY ;; | |
| 13 | RAM:=PLUS ;; ; | |

Table VII provides another exemplary program for a processor using the processor cell of FIG. 2 to further illustrate the capabilities of the cell. The program of Table VII is a STOIC program which shows the ability of the cell of FIG. 2 to perform substractions.

TABLE VII

% The contents of planes 0,1,2,3 are interpreted as a 2-dimensional
% array of 2-complemented bit integers, where plane 3
% stores the sign bits. The routine (STOIC word)
  MINUS computes
% the arithmetical negation of the said 2-dimensional array
% of integers and stores the results in planes 10,11,12,13,14
% where plane 14 will store the sign bits of
% the resulting array. Plane 11 is computed before
% plane 10, the latter one being a copy of plane 0 (the
% least significant bit of an integer and of its
% arithmetic negation are equal).
  'MINUS :

| | 0 | NS:=RAM C:=0 ;; |
|---|---|---|
| | 1 | EW:=RAM ;; |
| | 11 | RAM:NS:=PLUS ;; |
| | 10 | RAM:NS:=PLUS C:=1 ;; |
| | 2 | NS:EW:=RAM C:=CARRY ;; |
| | | NS:=PLUS C:=0 ;; |
| | 12 | RAM:=PLUS C:=1 ;; |
| | 3 | NS:EW:=RAM C:=CARRY ;; |
| | | NS:=PLUS C:=0 ;; |
| | 13 | RAM:=PLUS C:=1 ;; |
| | 3 | NS:EW:=RAM C:=CARRY ;; |
| | | NS:=PLUS C:=0 ;; |
| | 14 | RAM:=PLUS ;; ; |

Another form of the convolution program ADD_EAST of Table VI is provided below in Table VIII to illustrate the programming versatility of a parallel processor employing cells in accordance with the present invention.

TABLE VIII

% let contents of planes 0, 1 and 2 represent a 2 dimensional array
% of 2-complemented 3 bit integers, where plane 2 stores the sign
% bits then routine +—ADD_EAST computes the sum of each
% integer of the said array with its Eastern neighbor. The
% resulting array is stored in planes 10, 11, 12, 13, the last plane
% storing the sign bits. Routines ADD-EAST and
% +—ADD-EAST differ only by their last instruction.
'+—ADD_EAST :

| | 0 | NS:EW:=RAM C:=0 ;; |
|---|---|---|
| | | EW:=E ;; |
| | 10 | RAM:=PLUS C:=CARRY ;; |
| | 1 | NS:EW:=RAM ;; |
| | | EW:=E ;; |
| | 11 | RAM:=PLUS C:=CARRY ;; |
| | 2 | NS:EW:=RAM ;; |
| | | EW:=E ;; |
| | 12 | RAM:=PLUS C:=CARRY ;; |
| | 13 | RAM:=PLUS ;; ; |

It should be understood that various degrees of efficiency both in programming and speed may be obtained through slight modifications of the cell arrangement illustrated in FIG. 2. For example, certain transfer functions may be performed through the full adder (e.g. see instructions 11 and 12) with a corresponding decrease in hardware but a slight increase in programming complexity and a slight decrease in speed. Alternatively, with an increase in the control signals and selection hardware, certain signal transfer functions and even certain arithmetic and logic functions may be simplified.

Figure 5:
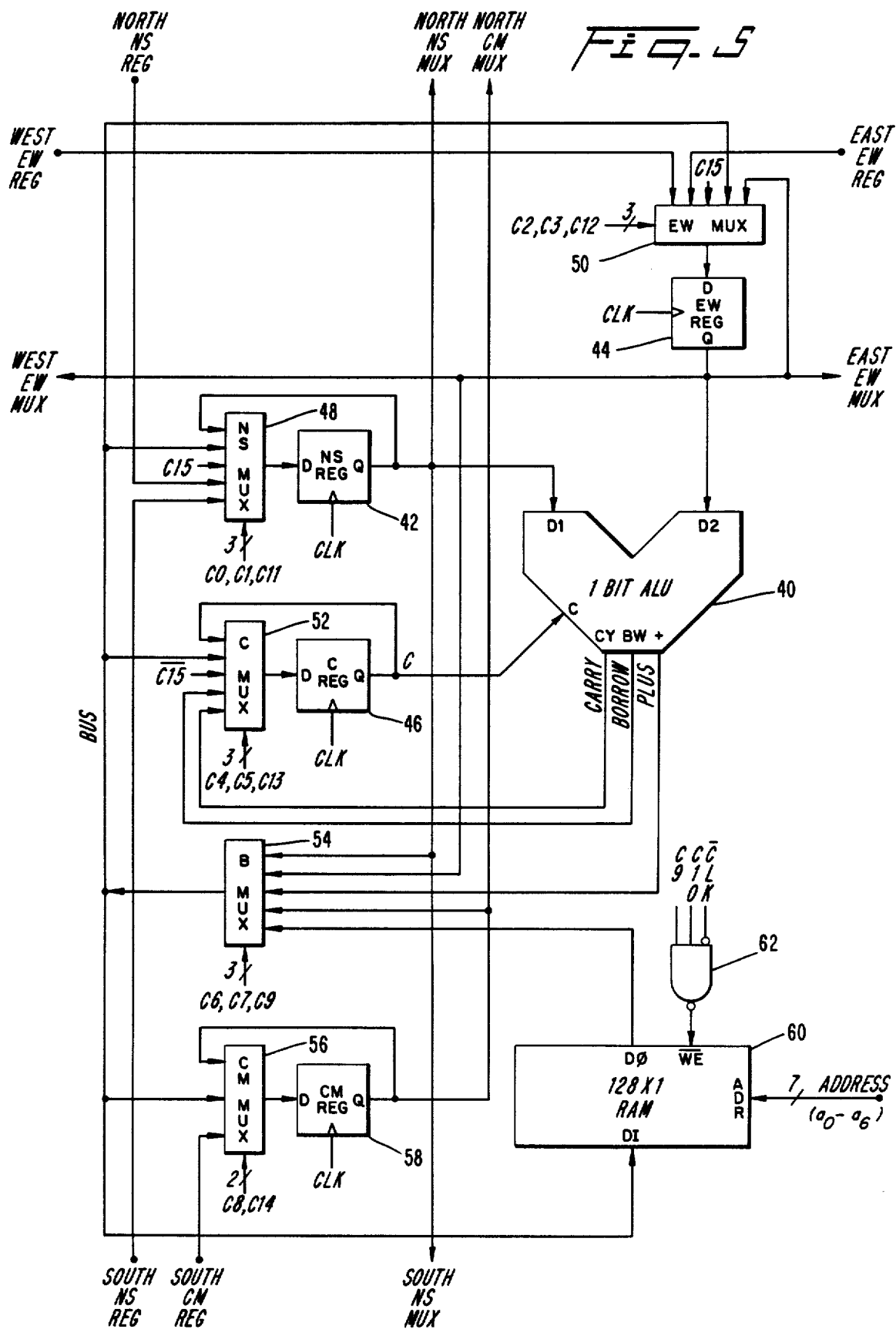
FIG. 5 is a functional block diagram illustrating another embodiment of a processor cell in accordance with the present invention.

For example, FIG. 5 illustrates one cell embodiment in which the full adder is expanded to include a "borrow" output signal BORROW and the NS and EW signals may be grated directly onto the data BUS. In addition, control signals are provided such that a binary ZERO and ONE may be loaded directly into the NS and EW registers, eliminating the need for subroutines of instructions such as 7 above. Also, a CM register for direct south to north data shifts is provided.

Referring now to FIG. 5, a conventional one bit full adder/substractor 40 having data input terminals D1 and D2 and a carry input terminal C, provides a PLUS output signal, a CARRY output signal and a BORROW output signal. Single bit data accumulators or registers 42, 44 and 46, designated the NS register, the EW register and the C register, respectively, have their output terminals connected to the respective D1, D2 and C input terminals of the adder 40. These registers 42, 44 and 46 are selectively loaded, when clocked, from conventional signal controllable, signal selection circuits (multiplexers MUX) 48, 50 and 52, respectively, each of which can selectively apply any one of five input signals to its associated register in response to command signals from the controller 12 of FIG. 1. A 5-input signal selection circuit (MUX) 54 selectively applies one of five input signals to a data bus BUS, and a 3-input signal selection circuit (MUX) 56 selectively applies one of three input signals to the data input terminal of a single bit accumulator or register 58 designated the CM register.

A conventional 128 by 1 RAM 60 has the data BUS connected to its data input terminal DI. The address inputs of the RAM receive the seven address signals $a_0-a_6$ from the controller 12 of FIG. 1, and the RAM output terminal D0 is connected to one input terminal of the bus multiplexer (BMUX) 54. A write enable input terminal of the RAM is controlled by the output signal from the conventional logic gate 62 which receives the $c_9$, $c_{10}$ and clock (CLK) signals at its input terminals.

In response to the $c_0$, $c_1$ and $c_{11}$ command signals from the controller 12, the NS signal selection circuit (NS MUX) 48 selects among the output signal from the NS register 42, the BUS signal, the N and S signals from the northern and southern neighboring cells, respectively and a control signal C15 which can be selectively set at ONE or ZERO by the controller. The EW signal selection circuit (EW MUX) 50 selects among the EW register 44 output signal, the E and W signals from the respective eastern and western neighboring cells, the BUS signal and a $c_{15}$ command from the controller 12, all in response to the $c_2$, $c_3$ and $c_{12}$ command signals from the controller. The carry signal selection circuit (C MUX) 52 responds to the $c_4$, $c_5$ and $c_{13}$ command signals from the controller 12 to select one of the CARRY, BORROW, BUS, $c_{15}$ and C signals, while the bus signals selection circuit (B MUX) 54 responds to the $c_6$, $c_7$ and $c_9$ command signals to select from the NS register output signal, the EW register output signal, the PLUS signal, the CM register output signal and the RAM output signal for application to a data bus BUS.

The cell illustrated in FIG. 5 operates in the same manner as that shown in FIG. 2 except some of the functions may be accomplished with much simpler programs. For example, subtraction may be accomplished directly by the FIG. 5 cell because of the provision of the borrow output signal from the full adder. With the full adder of FIG. 2, the intermediate step of complementing one signal was necessary for subtraction. In addition, data shifts through the CM register from south to north neighboring cells may be accomplished without interrupting ongoing processing. Thus, for example, an entire matrix may be loaded in the CM registers while an earlier loaded matrix is being processed.

Similarly, the FIG. 5 embodiment permits the programmer to directly load a ZERO or ONE in the NS and EW registers by control of the C15 command signal. The eliminates the need for a subroutine such as that set forth in instruction listing 7 above. Moreover, since the C register selection circuit 52 can be loaded directly from the BUS, subroutines such as 9 above can be simplified so as to place the NS signal on the BUS and then load the NS signal directly into the C register. Other programming simplifications rendered possible by the cell arrangement of FIG. 5 will be appreciated by those skilled in the art to which the invention pertains.

The memories of a processor constructed as an array of cells according to the present invention may be illustrated as memory "planes" to further facilitate an understanding of the operation of the processor. In FIG. 6, for example, the CM memories or registers of the FIG. 5 embodiment are shown as a memory plane with the ability to directly shift data within the plane in the north direction but in no other direction. The NS memories or registers of both cell embodiments are pictured as a memory plane with the ability to directly shift data in the north and south directions. The EW memories or registers of both cell embodiments form a memory plane within which data can be directly shifted east and west.

The memory planes formed by the C register and the RAM do not have any direct data shifting capabilities. Thus, the C register memory plane and the 128 memory planes of the RAM's are illustrated without direct shifting capability within the memory planes. Of course, data from the C register memory plane and the RAM memory planes may be shifted from one cell to another, but not directly. Intermediate steps such as first shifting this data into one of the direct shifting memory planes (NS, EW or, with the FIG. 5 embodiment, CM) are required.

It is contemplated that a parallel processor implemented with a cell arrangement according to the present invention is amenable to large scale integrated circuit (LSI) construction. With such construction there will be some array shape which will minimize the number of pins for a maximum number of cells.

By appropriate mathematical analysis, it can be found that the rectangular array which minimizes the number of communication pins on an LSI chip per cell on the chip, when implementing the FIG. 5 embodiment for example, is one which has twice as many cells in the "m" or vertical (North/South) direction than in the horizontal "n" (East/West) direction. For instance a chip with a total of 8 cells in the North/South direction and 8 in the East/West direction (an 8 by 8 array) will have the same number of pins as one with 6 cells in the East/West direction and 12 in the North/South direction (a 6 by 12 array). Since an 8 by 8 array has 64 cells while a 6 by 12 array contains 72, it is more economical to construct LSI circuits with m by n arrays where $m=2n$ when using the FIG. 5 cell.

With the FIG. 2 cell arrangement, it can be found that the number of pins can be minimized for a maximum number of cells on an LSI chip by providing a rectangular matrix an array of cells with equal numbers of cells in each direction. With the above example then, the 8 by 8 array would have a minimum number of pins for a maximum array size.

Figure 7:
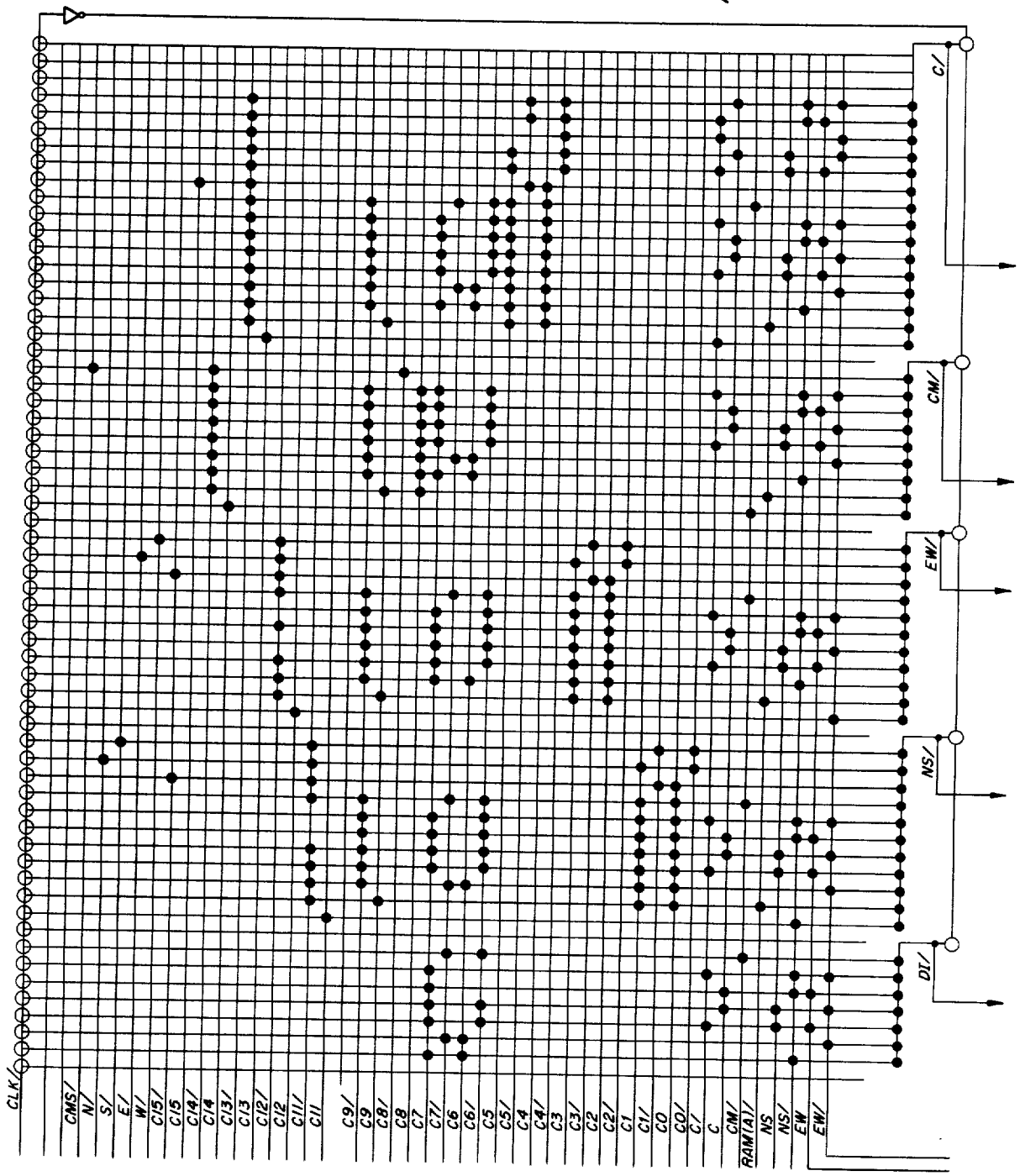
FIG. 7 is a functional diagram of a cell according to the present invention implemented in accordance with one possible very large scale integration (VLSI) technique.

One possible very large scale is integrated circuit (VLSI) cell in accordance with the present invention is partially illustrated in FIG. 7 to facilitate an understanding of how, in such an implementation, the functions described above may be obtained but perhaps without specific connections such as the data bus.

Referring to FIG. 7, the part of the cell comprising the processing element of the previous embodiments is illustrated using a conventional VLSI "lattice" diagram. The signals shown on the left side of the Figure are the control signals and memory signals previously discussed, although it should be noted that both a signal and its complement are provided in most instances (e.g., the EW/and EW signals). The vertical lines in FIG. 7 represent logical AND functions of the signals supplied from the left on the horizontal lines. More specifically, if one follows a vertical line and finds a dot at the intersection of two horizontal lines, the signal on the vertical line is the AND function of those two signals coming in on the horizontal lines. The signal on the top horizontal line is a system clock which is applied to each vertical line.

Thus, on the left-most vertical line, the only signal that appears is the clock. On the next vertical line going toward the right, the signal is NS/ AND $C_6$ and $C_7$ AND CLK/. The next line to the right is the "AND" and EW/, $C_6$, $C_7$/ and CLK/. It can be seen that the vertical lines also are interconnected in groups at the bottom of the Figure. Each such group connection represents the logical OR of all the signals appearing on the vertical lines. The output signals from these groups of vertical lines are shown at the bottom of FIG. 7. They are, respectively from left to right, DI/, NS/, EW/, CM/ and C/, representing the current value of the RAM data input signal, the NS register input signal, the EW register input signal, the CM register input signal and the C register input signal, respectively.

It will be appreciated by one skilled in the art that the implementation of FIG. 7 functions as a full adder/substractor as described in connection with FIG. 5. For example, each group of "OR'ed" vertical lines has four lines which provide the AND of C/,NS,EW and C,NS,EW/ and C, NS/, EW and C/,NS/,EW/ which together perform the adder/subtractor truth table functions. Although there is no data bus in the same sense as in the FIGS. 2 and 5 embodiments, the bus function is performed within the logic array.

While one configuration of a processor using cells according to the present invention is shown in FIG. 1 as a rectangular array of m by n cells where m and n are both greater than one, other configurations may be desirable. A linear array (mxn cells with m=1) may be useful, for example, in applications involving the processing of linear data. One possible configuration for such a linear processor is illustrated in FIG. 8.

Figure 8:
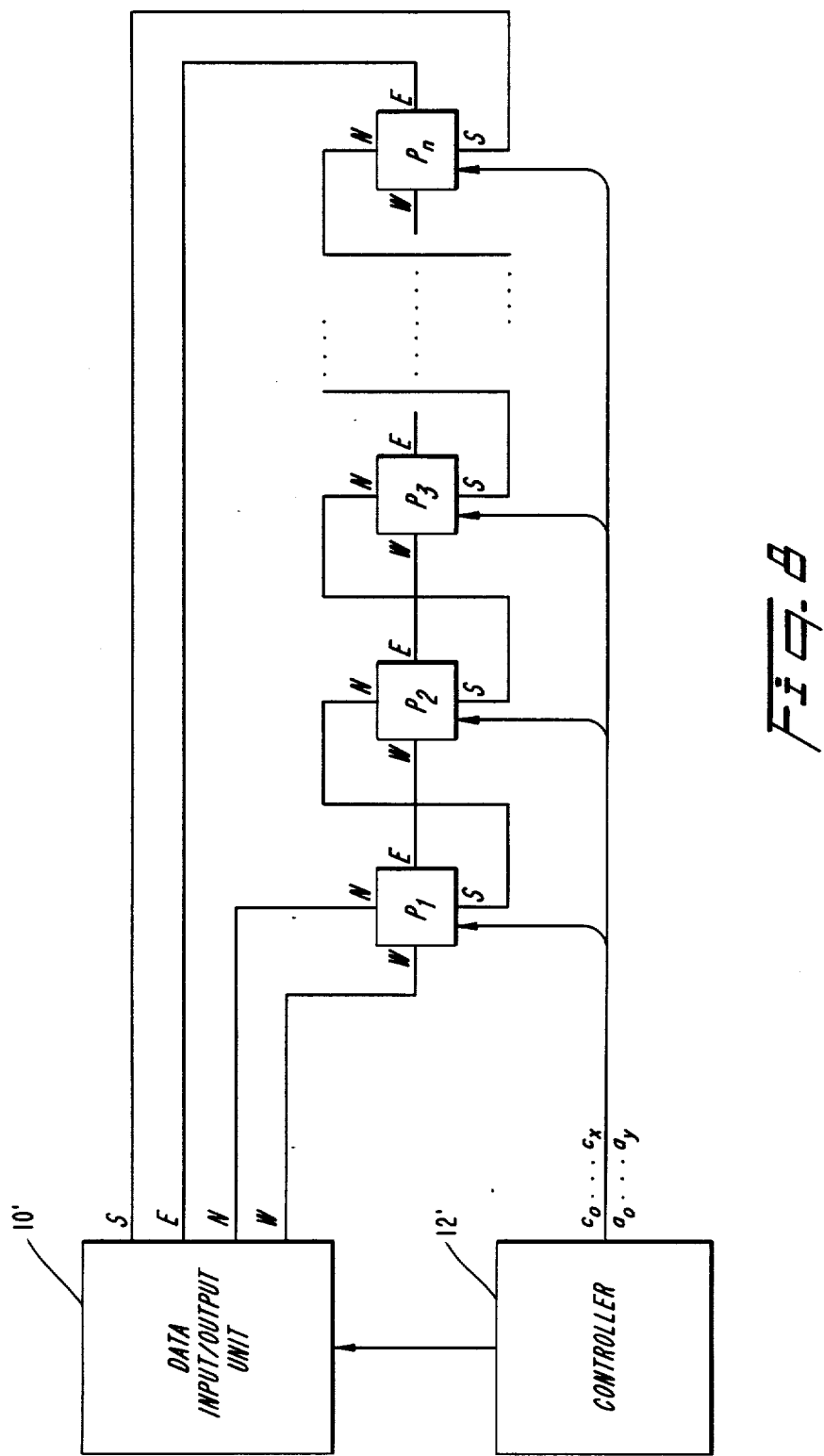
FIG. 8 is a functional block diagram of a linear processor constructed with cells in accordance with the present invention.

Referring now to FIG. 8, a plurality of identical processor cells P1–Pn (e.g. cells of the FIG. 2 embodiment, for simplicity in illustration) are connected so that the east terminal E of each cell is connected to the west terminal W of each neighboring cell and the south terminal S of each cell is connected to the north terminal N of its neighboring cell. The first and last cells P1 and Pn have their respective north and west terminals, N, W and south and east terminals S, E connected to the data input/output unit 10'. Each cell receives the command signals $c_o-c_x$ and the address signals $a_o-a_y$ from the controller 12'.

The data input/output unit is like that previously described in connection with FIG. 1 except it has only one input/output line for each of the N, S, E and W signals since there is only one row of cells. The controller similarly is like that described in connection with FIG. 1.

Linear data is loaded into the processor by shifting it out of the input/output unit 12' into the first cell and then to subsequent cells until a full line of data is stored in the processor. Alternatively, an entire line of data may be shifted into the processor in parallel with a slightly modified, parallel connection between the processor and the input/output unit. When the data is loaded, the processor may be controlled in any desired manner as was previously described to perform arithmetic and/or logical functions on the data. The processed data is then available for shifting to the input-/output unit for further use.

The principles, preferred embodiments and modes of operation of the present invention have been described in the foregoing specification. The invention which is intended to be protected herein, however, is not be to construed as limited to the particular forms disclosed, since these are to be regarded as illustrative rather than restrictive. Moreover, variations and changes may be made by those skilled in the art without departing from the spirit of the present invention.

What is claimed is:

1. A parallel data processor having a plurality of cells for processing digital data signals, comprising:
   a controller for generating control signals in response to program instructions; and,
   a plurality of identical interconnected cells each including a full adder having two data input terminals, a carry input terminal, a sum output terminal, and a carry output terminal, and a plurality of memories connected to said full adder and said controller, the memories each being individually controllable to supply selected ones of a plurality of predetermined data signals to the input terminals of said full adder in response to control signals from the controller, the memories being connected to the full adder and the controller such that both logical and arithmetic operations are performed by the full adder.

2. The data processor of claim 1 including n times m cells interconnected in an n by m matrix with each cell connected to at least two neighboring cells or to at least one neighboring cell and an outside data source or sink.

3. The data processor of claim 1 including n times m cells interconnected in an n by m matrix with interior cells and edge cells, each interior cell of the matrix being connected to four neighboring cells and each edge cell of the matrix being connected to at least two neighboring cells and to a data input/output means for supplying data to some of the edge cells and receiving data from some of the edge cells.

4. The data processor of claim 1, wherein said plurality of memories includes a multi-bit memory having an output terminal and selectively addressable storage locations, the control signals from said controller including memory address signals for selectively applying stored data signals to said output terminal.

5. The data processor of claim 2 wherein said plurality of memories includes a multi-bit memory having an output terminal and selectively addressable storage locations, the control signals from said controller including memory address signals for selectively applying stored data signals to said output terminal.

6. The data processor of claim 3 wherein said plurality of memories includes a multi-bit memory having an output terminal and selectively addressable storage locations, the control signals from said controller including memory address signals for selectively applying stored data signals to said output terminal.

7. The data processor of claim 4, wherein said plurality of memories includes first, second a third single-bit data registers, each selectively controllable to load one of said plurality of predetermined data signals.

8. The data processor of claim 7, wherein each cell includes a data bus and means for selectively applying one of a plurality of data signals including at least the signals, from the sum output terminals of the adder and the output terminal of the multi-bit memory.

9. the data processor of claim 8, wherein said multi-bit memory is a random access memory.

10. A data processing cell for processing single bits of digital data comprising:
a full adder having first and second data input terminals, a carry input terminal, a sum output terminal and a carry output terminal;
an addressable, multi-bit memory having a data input terminal, a data output terminal and a plurality of address terminals;
bus selector means for selectively applying an output signal from the output terminal of said multi-bit memory or the output signal from the sum output terminal of the full adder to a data bus in response to a first control signal;
means for selectively applying the output signal from the multi-bit memory or a bus output signal from the data bus to the input terminal of the multi-bit memory in response to a second control signal;
a carry input accumulator for selectively applying a carry output signal from the carry output terminal or a desired logic level to the carry input terminal of the full adder in response to a third control signal;
a first data input accumulator means for selectively applying a first data input signal, second data input signal or a bus input signal from the data bus to one of first and second data input terminals of the full adder in response to a fourth control signal; and,
a second data input accumulator means for selectively applying a third data input signal, a fourth data input signal or said bus input signal to the other of said first and second data input terminals of the full adder in response to a fifth control signal, said full adder, said memory and said accumulators being connected such that said full adder performs both arithmetic and logical operations in response to said control signals.

11. A data processing cell for processing digital data signals comprising:
a full, one bit adder having first and second data input terminals, a carry input terminal, a sum output terminal and a carry output terminal;
a single bit carry memory connected to the carry input terminal of the adder;
a first single bit data memory connected to one of the first and second data input terminals of the adder;
a second single bit data memory connected to the other of the first and second data input terminals of the adder;
a random access memory having a data input terminal and a data output terminal;
a data bus;
bus selector means for selectively applying one of a plurality of single bit data signals, including the output signal from the random access memory output terminal and the output signal from the adder sum output terminal, to the data bus in response to a first control signal;
means for selectively applying one of a plurality of single bit data signals, including the output signal from the adder carry output terminal and a desired logic level, to the single bit carry memory in response to a second control signal;
means for selectively applying one of a plurality of single bit data signals, including the signal stored by the first single bit data memory, the signal on the data bus, and the output signals from two cell input terminals, to the first single bit data memory in response to a third control signal; and
means for selectively applying one of a plurality of single bit data signals, including the signal stored by the second single bit data memory, the signal on the data bus, and the output signals from two cell input terminals, to the second single bit data memory in response to a fourth control signal, whereby said full adder performs both logical and arithmetic operations in response to said control signals.

12. A data processing cell for processing single bit, digital signals comprising:
a full adder having first and second data input terminals, a carry input terminal, a sum output terminal, and a carry output terminal, the full adder producing signals at said output terminals related to the arithmetic result of first, second and third input signals applied to said first, second and carry input terminals, respectively;
a plurality of digital signal memories connected to said first, second and carry input terminals of said full adder each for selectively storing one of a plurality of single bit data input signals as said first, second and third input signals, respectively, in response to a plurality of control signals; and,
an addressable, multi-bit memory having an output terminal providing, from an addressed memory location, one of the plurality of single bit data input signals,
the full adder and the memories being interconnected and controlled by said control signals so that the full adder performs both arithmetic and logical operations with said plurality of single bit data input signals.

13. A data processor having a plurality of processing cells for high speed processing of digital data signals comprising:

a controller for generating control signals in response to program instructions; and, a plurality of identical interconnected cells each connected to receive said control signals from said controller and each including a single-bit full adder processing element with three input terminals and two arithmetic output terminals, and a plurality of single-bit memories connected to said full adder processing element, the memories each being individually controllable to supply selected ones of a plurality of predetermined data signals to the input terminals of said processing element in response to control signals from the controller, the memories and the full adder processing element being connected to the controller such that both logical and arithmetic operations are performed by the full adder processing element in response to said control signals without a separate logic processing element.

14. The data processor of claim 13 including n times m cells interconnected in an n by m matrix with each cell connected to at least two neighboring cells or to at least one neighboring cell and an outside source or sink.

15. The data processor of claim 13 including n times m cells interconnected in an n by m matrix with interior cells and edge cells, each interior cell of the matrix being connected to four neighboring cells and each edge cell of the matrix being connected to at least two neighboring cells and to a data input/output means for supplying data to some of the edge cells and receiving data from some of the edge cells.

16. The data processor of claim 13 including a plurality of cells interconnected in a linear array.

17. The data processor of claim 13 wherein each cell includes a plurality of multiplexers, one for each of said single-bit memories, each multiplexer selecting one of said plurality of data signals for application to its associated memory in response to said control signals.

18. The data processor of claim 17 wherein each cell includes a data bus, said data bus being connected to at least some of said multiplexers such that a signal on said data bus may be selectively applied to at least some of said memories.

19. A parallel data processor having a plurality of cells for processing digital signals, comprising:
a controller for generating control signals in response to program instructions; and,
a plurality of identical interconnected cells each including a full adder/subtractor having two data input terminals, a carry input terminal, a sum output terminal, a carry output terminal, and a borrow output terminal, and a plurality of memories connected to said full adder/subtractor and said controller, the memories each being individually controllable to supply selected ones of a plurality of predetermined data signals to the input terminals of said full adder/subtractor in response to control signals from the controller, the memories being connected to the full adder/subtractor and the controller such that both logical and arithmetic operations are performed by the full adder/subtractor.

20. The data processor of claim 19, wherein said plurality of memories includes a multi-bit memory having an output terminal and selectively addressable storage locations, the control signals from said controller including memory address signals for selectively applying stored data signals to said output terminal.

21. The data processor of claim 20, wherein said plurality of memories includes first, second and third single-bit data registers, each selectively controllable to load one of said plurality of predetermined data signals.

22. The data processor of claim 21, wherein each cell includes a data bus and means for selectively applying one of a plurality of data signals, including at least the signals, from the sum output terminals of the adder and the output terminal of the multi-bit memory.

23. The data processor of claim 22, wherein said multi-bit memory is a random access memory.

24. The data processor of claim 19 including n times m cells interconnected in an n by m matrix with each cell connected to at least two neighboring cells or to at least one neighboring cell and an outside data source or sink.

25. The data processor of claim 19 including n times m cells interconnected in an n by m matrix with interior cells and edge cells, each interior cell of the matrix being connected to four neighboring cells and each edge cell of the matrix being connected to at least two neighboring cells and to a data input/output means for supplying data to some of the edge cells and receiving data from some of the edge cells.

26. A data processing cell for processing single bit, digital signals comprising:
a full adder/subtractor having first and second data input terminals, a carry input terminal, a sum output terminal, a carry output terminal, and a borrow output terminal, the full adder/subtractor producing signals at said output terminals related to the arithmetic result of first, second and third input signals applied to said first, second and carry input terminals, respectively;
a plurality of digital signal memories connected to said first, second and carry input terminals of said full adder/subtractor each for selectively storing one of a plurality of single bit data input signals as said first, second and third input signals, respectively, in response to a plurality of control signals; and,
an addressable, multi-bit memory having an output terminal providing, from an addressed memory location, one of the plurality of single bit data input signals,
the full adder/subtractor and the memories being interconnected and controlled by said control signals so that the full adder/subtractor performs both arithmetic and logical operations with said plurality of single bit data input signals.

27. The data processing cell of claim 26, wherein said multi-bit memory has selectively addressable storage locations, the control signals including memory address signals for selectively applying stored data signals to said output terminal.

28. The data processing cell of claim 27, wherein said plurality of single bit memories includes first, second and third single-bit data registers, each selectively controllable to load one of said plurality of predetermined data signals.

29. The data processing cell of claim 28, wherein each cell includes a data bus and means for selectively applying one of a plurality of data signals including at least the signals from the sum output terminal of the adder/subtractor and from the output terminal of the multi-bit memory.

30. The data processing cell of claim 29, wherein said multi-bit memory is a random access memory.

31. The parallel data processor of claim 1 wherein said plurality of memories includes a carry input memory connected to the carry input terminal of the full adder, said carry input memory being selectively controllable to store a binary ONE or a binary ZERO logic level in response to said control signals.

32. The parallel data processor of claim 27 wherein said plurality of memories includes a carry input memory connected to the carry input terminal of the full adder, said carry input memory being selectively controllable to store a binary ONE or a binary ZERO logic level in response to said control signals.

33. The data processing cell of claim 16 wherein said plurality of digital signal memories includes a carry input memory connected to the carry input terminal of the full adder, said cell including means for selectively storing a binary ONE or a binary ZERO logic level in said carry input memory in response to said control signals.

34. The data processing cell of claim 16 wherein said cell is arranged in a matrix of n by m identical, interconnected cells.

35. The data processing cell of claim 34 wherein said matrix of cells is formed on an integrated circuit chip.

36. The data processing cell of claim 35 wherein both n and m are greater than one.

37. The data processing cell of claim 30 wherein said plurality of digital signal memories includes a carry input memory connected to the carry input terminal of the full adder, said cell including means for selectively storing a binary ONE or a binary ZERO logic level in said carry input memory in response to said control signals.

38. The data processing cell of claim 30 wherein said cell is arranged in a matrix of n by m identical, interconnected cells.

39. The data processing cell of claim 38 wherein said matrix of cells is formed on an integrated circuit chip.

40. The data processing cell of claim 39 wherein both n and m are greater than one.

41. A data processing cell for processing single bits of digital data in a parallel processor array comprising:
  a full adder having first and second data input terminals, a carry input terminal, a sum output terminal and a carry output terminal;
  a carry input accumulator means for selectively applying a first data signal or a desired binary ONE or binary ZERO logic level to the carry input terminal of the full adder in response to a first control signal;
  a first data input accumulator means for selectively applying a second data input signal to one of first and second data input terminals of the full adder in response to a second control signal; and,
  a second data input accumulator means for selectively applying a third data input signal to the other of said first and second data input terminals of the full adder in response to a third control signal,
  said full adder and said accumulators being connected such that said full adder performs both arithmetic and logical operations in response to said control signals, said logical operations including at least a logical OR operation and a logical AND operation, the results of said logical OR and AND operations being taken from the carry output terminal of the full adder.

42. A data processing cell for processing digital data signals comprising:
  a full, one bit adder having first and second data input terminals, a carry input terminal, a sum output terminal and a carry output terminal;
  a single bit carry memory connected to the carry input terminal of the adder;
  a first single bit data memory connected to one of the first and second data input terminals of the adder;
  a second single bit data memory connected to the other of the first and second data input terminals of the adder;
  first and second cell input signal lines operatively connected to an input terminal of the first single bit data memory;
  third and fourth cell input signal lines operatively connected to an input terminal of the second single bit data memory;
  first and second cell output signal lines operatively connected to an output terminal of the first single bit data memory;
  third and fourth cell output signal lines operatively connected to an output terminal of the second single bit data memory; and,
  means for selectively applying one of a plurality of single bit data signals, including the output signal from the adder carry output terminal, a binary ONE logic level, and a binary ZERO logic level to the single bit carry memory in response to a control signal, whereby said full adder can perform both logical and arithmetic operations.

43. A data processing cell for processing single bit, digital signals comprising:
  a full adder having first and second data input terminals, a carry input terminal, a sum output terminal, and a carry output terminal, the full adder producing signals at said output terminals related to the arithmetic result of first, second and third input signals applied to said first, second and carry input terminals, respectively;
  first, second, and third digital signal memories connected, respectively, to said first, second and carry input terminals of said full adder to store said first, second and third input signals, respectively, in response to a plurality of control signals; and,
  an addressable, multi-bit memory having an output terminal providing, from an addressed memory location, a data output signal, said output terminal being operatively connected to at least two of said digital signal memories,
  the full adder and the memories being interconnected and controlled by said control signals so that the full adder performs both arithmetic and logical operations.

44. The data processing cell of claim 43 including means for selectively storing a binary ONE or a binary ZERO signal level in said third digital signal memory, and wherein the logical operations are performed by the full adder on the first and second input signals stored in the first and second digital signal memories, the type of logical operation being determined by the logic level stored in the third digital signal memory.

45. A parallel data processor having a plurality of cells for processing digital data signals, comprising:
  a controller for generating control signals in response to program instructions; and,
  a plurality of identical interconnected cells each including:
    a full adder/subtractor having first and second data input terminals, a carry input terminal, a sum output terminal, a carry output terminal, and a borrow output terminal; and, first, second and third data storage means connected, respectively, to the first input terminal, the second input terminal, and the carry input terminal of said full adder/subtractor, each of said first, second, and third data storage means being connected to said controller, the data storage means each being individually controllable to supply selected ones of a plurality of predetermined data signals to the input terminals of said full adder/subtractor in response to control signals from the controller, the memories being connected to the full adder/subtractor and the controller such that both logical and arithmetic operations are performed by the full adder/subtractor, the logical operations including at least an OR operation and an AND operation.

46. The data processor of claim 45 wherein each cell includes a fourth data storage means connected to said controller, to at least one of said first, second, and third data storage means, and to at least two neighboring cells or to at least one neighboring cell and an outside data source or sink.

47. The data processor of claim 46 wherein each of said data storage means includes:

a data input terminal and a data output terminal; and, means connected to the data input terminal for selectively applying a data signal to said data input terminal in response to said control signals from said controller.

48. The data processor of claim 47 wherein the fourth data storage means of each cell is operatively connected to the fourth data storage means of said at least two neighboring cells.

49. The data processor of claim 45 wherein each cell includes a multi-bit memory having an output terminal operatively connected to at least some of said data storage means.

50. The data processor of claim 45 wherein said third data storage means comprises a carry input memory connected to the carry input terminal of the full adder, said carry input memory being selectively controllable to store a binary ONE or a binary ZERO logic level in response to said control signals.

51. The data processor of claim 50 wherein each cell includes a fourth data storage means connected to said controller, to at least one of said first, second, and third data storage means, and to at least two neighboring cells or to at least one neighboring cell and an outside data source or sink.

52. The data processor of claim 51 wherein each of said data storage means includes:

a data input terminal and a data output terminal; and, means connected to the data input terminal for selectively applying a data signal to said data input terminal in response to said control signals from said controller.

53. The data processor of claim 52 wherein the fourth data storage means of each cell is operatively connected to the fourth data storage means of said at least two neighboring cells.

54. The data processor of claim 50 wherein each cell includes a multi-bit memory having an output terminal operatively connected to at least some of said data storage means.

55. The data processor of claim 45 wherein said cells are arranged in a matrix of n by m identical, interconnected cells.

56. The data processor of claim 55 wherein said matrix of cells is formed on an integrated circuit chip.

* * * * *